(12) United States Patent  
Ueta et al.

(10) Patent No.: US 9,533,567 B2  
(45) Date of Patent: Jan. 3, 2017

(54) CONSTRUCTION MACHINE

(71) Applicant: KOBELCO CONSTRUCTION MACHINERY CO., LTD., Hiroshima-shi (JP)

(72) Inventors: Toshiro Ueta, Hiroshima (JP); Masakazu Ozaki, Hiroshima (JP); Takayuki Maeda, Hiroshima (JP); Michio Hirayama, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/937,069

(22) Filed: Nov. 10, 2015

(65) Prior Publication Data

US 2016/0137054 A1 May 19, 2016

(30) Foreign Application Priority Data

Nov. 17, 2014 (JP) ................. 2014-232994

(51) Int. Cl.
| | |
|---|---|
| *B60K 13/04* | (2006.01) |
| *E02F 9/08* | (2006.01) |
| *E02F 9/22* | (2006.01) |
| *B60K 25/00* | (2006.01) |
| *E02F 3/42* | (2006.01) |

(Continued)

(52) U.S. Cl.
CPC ............ *B60K 13/04* (2013.01); *B60K 25/00* (2013.01); *E02F 3/425* (2013.01); *E02F 9/0866* (2013.01); *E02F 9/2275* (2013.01); *F01N 3/035* (2013.01); *F01N 3/2066* (2013.01); *F01N 13/18* (2013.01)

(58) Field of Classification Search  
None  
See application file for complete search history.

(56) References Cited

U.S. PATENT DOCUMENTS

2014/0102085 A1  4/2014 Mori et al.

FOREIGN PATENT DOCUMENTS

| EP | 2 243 651 A1 | 10/2010 |
| JP | 2001-271375 | 10/2001 |

(Continued)

OTHER PUBLICATIONS

Extended European Search Report issued May 2, 2016 in Patent Application No. 15194445.1

*Primary Examiner* — John Walters  
*Assistant Examiner* — Hilary L Johns  
(74) *Attorney, Agent, or Firm* — Oblon, McClelland, Maier & Neustadt, L.L.P.

(57) ABSTRACT

The rear wall portion has a curved portion curved in an approximately arc shape in top plan view to serve as a right or left end thereof. An engine is provided on the upper frame at a position in front of the rear wall portion in such a manner that an interspace is formed between the engine and the curved portion. An exhaust aftertreatment device is provided in front of the rear wall portion while being superposed over the interspace. The exhaust aftertreatment device comprises a first treatment section and a second treatment section. The first treatment section and the second treatment section are supported over the upper frame in a posture where respective longitudinal directions of the first and second treatment sections are oriented parallel to each other in top plan view and along the curved portion in top plan view.

5 Claims, 7 Drawing Sheets

FRONT ←→ REAR

(51) Int. Cl.
*F01N 3/035* (2006.01)
*F01N 3/20* (2006.01)
*F01N 13/18* (2010.01)

(56) References Cited

FOREIGN PATENT DOCUMENTS

| | | | |
|---|---|---|---|
| JP | 2001271375 A | * | 10/2001 |
| JP | 2008-156835 | | 7/2008 |
| JP | 2011-157721 | | 8/2011 |
| JP | 2012-117249 | | 6/2012 |
| JP | 5496149 | | 5/2014 |

* cited by examiner

FRONT ←→ REAR

CONSTRUCTION MACHINE

TECHNICAL FIELD

The present invention relates to a construction machine, such as a hydraulic excavator, comprising an exhaust aftertreatment device for treating exhaust gas of an engine.

BACKGROUND ART

Heretofore, there has been known a construction machine comprising a lower traveling body, an upper slewing body provided on the lower traveling body slewably about a slewing axis, and a work implement attached to the upper slewing body in a raisable and lowerable manner (such as a hydraulic excavator described in JP 2011-157721 A (hereinafter referred to as "Patent Literature 1")).

In the hydraulic excavator described in the Patent Literature 1, a rear portion of the upper slewing body has a shape capable of staying within a range equal to or slightly greater than a width of the lower traveling body during a slewing movement about the slewing axis.

Specifically, the upper slewing body comprises an upper frame slewably provided on the lower traveling body, and a rear wall portion provided in a rear portion of the upper frame to cover a space over the upper frame from therebehind. The rear wall portion has a right or left end portion curved in an approximately arc shape in top plan view (this end will hereinafter be referred to as "curved portion").

The hydraulic excavator described in the Patent Literature 1 further comprises an engine provided on the upper frame at a position in front of the rear wall portion, and an exhaust aftertreatment device configured to treat exhaust gas of the engine, and provided in front of the rear wall portion while being superposed over an interspace between the engine and the curved portion. As above, the exhaust aftertreatment device is provided at a position offset laterally from a position directly above the engine (provided over the interspace between the engine and the curved portion), so that it becomes possible to ensure a space for performing maintenance of the engine above the engine.

The exhaust aftertreatment device comprises a first treatment section capable of removing a first component contained in the exhaust gas, and a second treatment section capable of removing a second component contained in the exhaust gas.

The first treatment section and the second treatment section are supported over the upper frame, while being arranged side-by-side in a right-left (lateral) direction. In this arrangement, respective longitudinal directions of the first and second treatment sections are oriented along a front-rear direction and parallel to each other. Further, respective longitudinal edge faces (rear edge faces) of the first and second treatment sections are positioned in offset relation from each other in the front-rear direction, in conformity to a shape of the curved portion.

However, in the hydraulic excavator described in the Patent Literature 1, because the longitudinal directions of the first and second treatment sections are oriented along the front-rear direction, a relatively wide dead space is undesirably formed between the curved portion, and the longitudinal edge faces and longitudinally-extending lateral surfaces (right lateral surfaces) of the first and second treatment sections, in a top plan view.

SUMMARY OF INVENTION

It is an object of the present invention to provide a construction machine capable of efficiently disposing an exhaust aftertreatment device over an upper frame, while ensuring a space for maintenance of an engine.

In order to solve the above problem, the present invention provides a construction machine which comprises: a lower traveling body; an upper frame slewably provided on the lower traveling body; a rear wall portion provided at a rear portion of the upper frame to cover a space over the upper frame from therebehind, wherein the rear wall portion has a curved portion curved in an approximately arc shape in top plan view to serve as a right or left end thereof; an engine provided on the upper frame at a position in front of the rear wall portion in such a manner that an interspace is formed between the engine and the curved portion; and an exhaust aftertreatment device configured to treat exhaust gas of the engine, and provided in front of the rear wall portion while being superposed over the interspace, the exhaust aftertreatment device comprising a first treatment section capable of removing a first component contained in the exhaust gas, and a second treatment section capable of removing a second component contained in the exhaust gas, wherein the first treatment section and the second treatment section are supported over the upper frame in a posture where respective longitudinal directions thereof are oriented parallel to each other in top plan view and along the curved portion in top plan view.

The present invention makes it possible to efficiently dispose the exhaust aftertreatment device over the upper frame, while ensuring a space for maintenance of the engine.

DESCRIPTION OF EMBODIMENTS

With reference to the accompanying drawings, the present invention will now be described based on embodiments thereof. It should be understood that the following embodiments are presented as some preferred examples obtainable by embodying the present invention, and not intended to limit the technical scope of the present invention.

<First Embodiment (FIGS. 1 to 5)>

Figure 1:
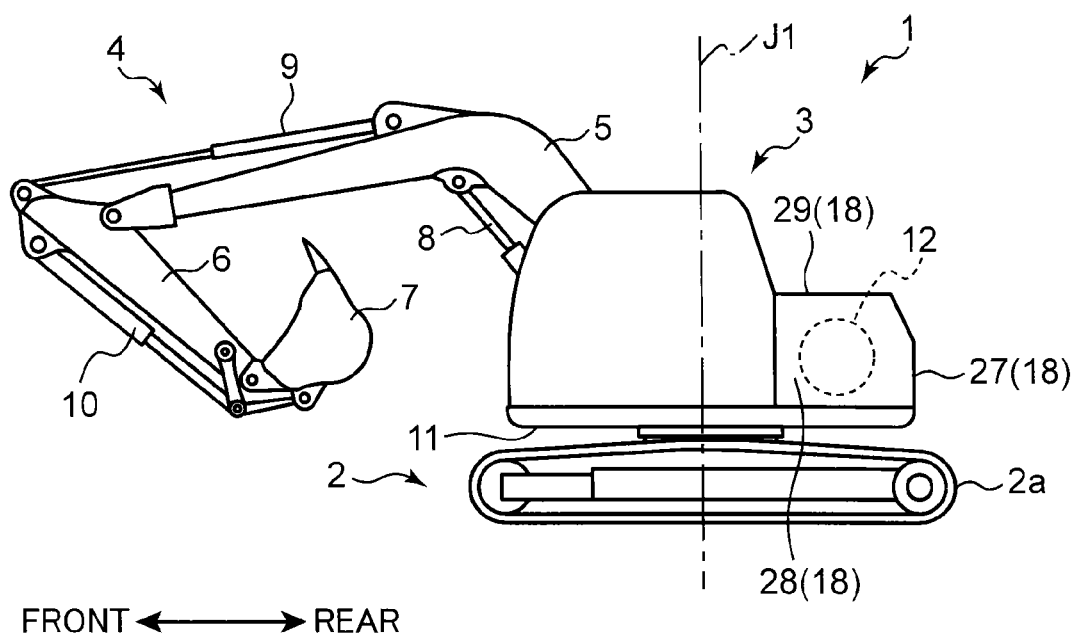
FIG. 1 is a side view illustrating an overall structure of a hydraulic excavator according to a first embodiment of the present invention.

Referring to FIG. 1, a hydraulic excavator 1 as one example of a construction machine according to a first embodiment of the present invention comprises: a lower traveling body 2 provided with a crawler 2a; an upper slewing body 3 provided on the lower traveling body 2 slewably about a slewing axis J1; and a work implement 4 attached to the upper slewing body 3 in a raisable and lowerable manner. The following description will be made using front-rear and right-left directions on the basis of an operator seated in a non-illustrated operator's seat provided on the upper slewing body 3.

The work implement 4 comprises: a boom 5 having a base end attached to the upper slewing body 3 raisably and lowerably about a rotation axis J4 (see FIG. 3) extending along a right-left (lateral) direction; an arm 6 having a base end rotatably attached to a distal end of the boom 5; and a bucket 7 rotatably attached to a distal end of the arm 6.

The work implement 4 is provided with: a boom cylinder 8 operable to raisably and lowerably drive the boom 5 with respect to the upper slewing body 3; an arm cylinder (hydraulic actuator) 9 operable to rotatably drive the arm 6 with respect to the boom 5; and a bucket cylinder (hydraulic actuator) 10 operable to rotatably drive the bucket 7 with respect to the arm 6. The arm cylinder 9 is attached to the boom 5 and the arm 6, and the bucket cylinder 10 is attached to the arm 6 and the bucket 7.

Figure 2:
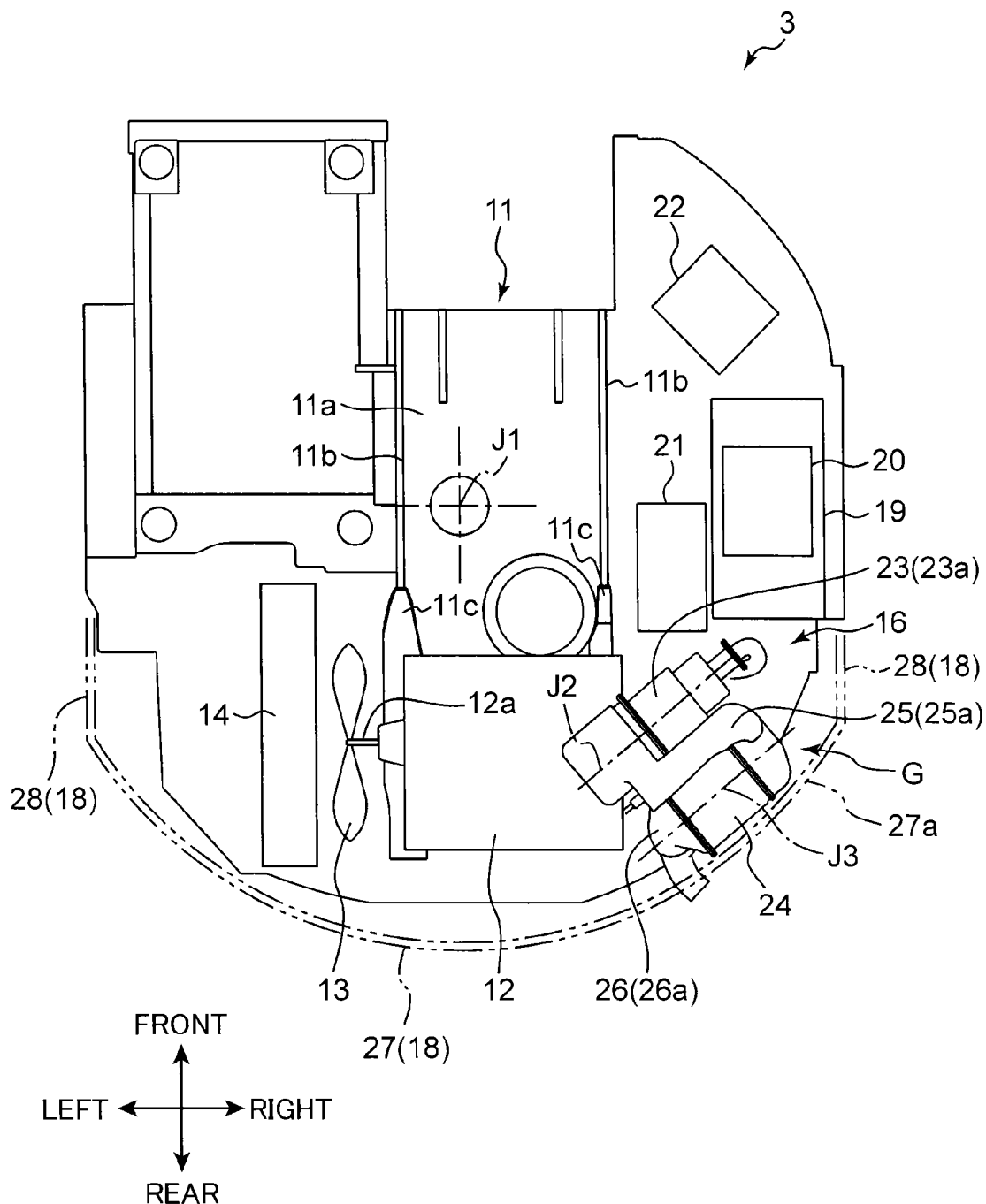
FIG. 2 is a top plan view illustrating a substantial part of an upper slewing body in FIG. 1.
Figure 3:
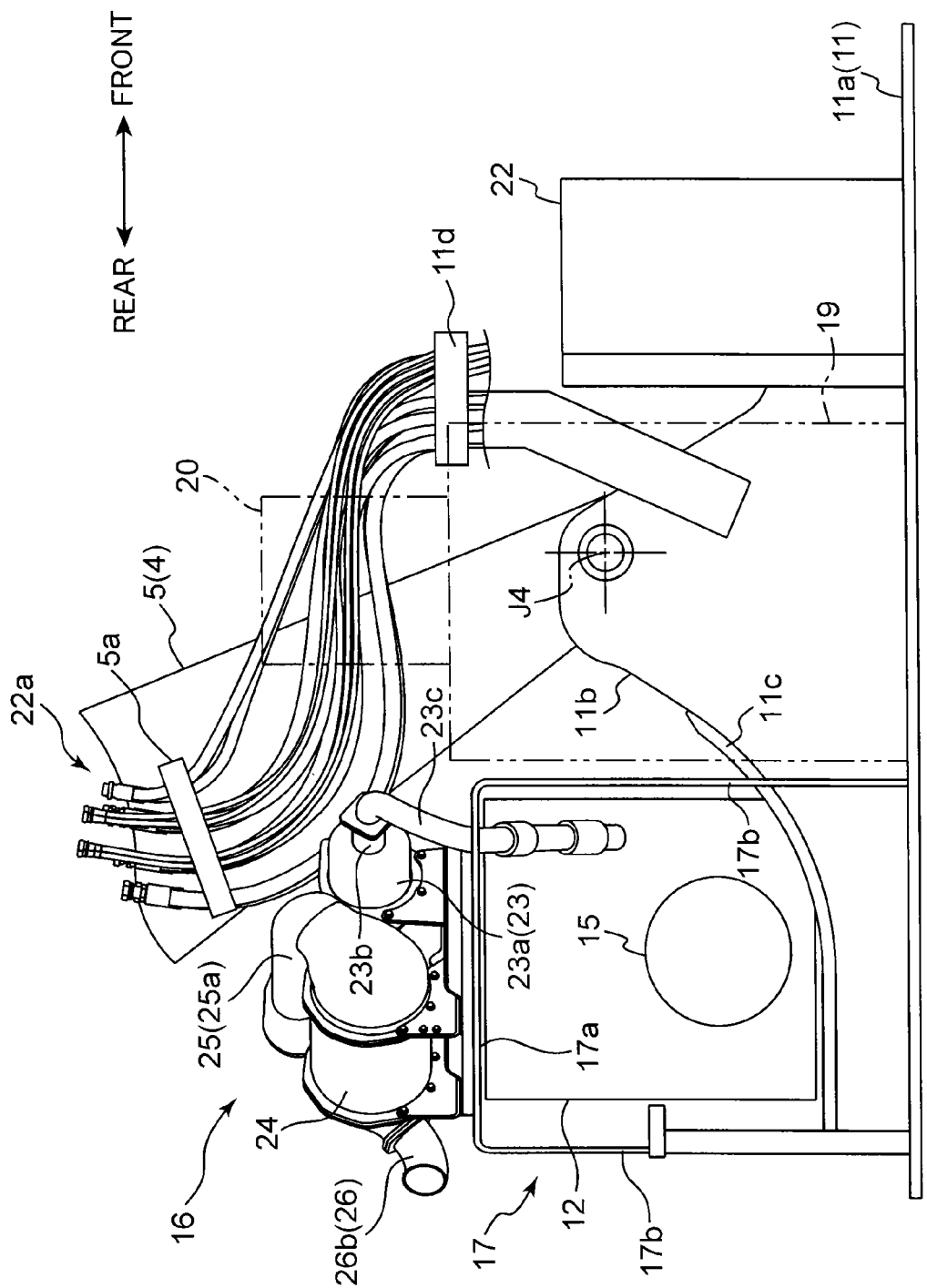
FIG. 3 is a side view illustrating a substantial part of the upper slewing body in FIG. 2.

Referring to FIGS. 1 to 3, the upper slewing body 3 comprises: an upper frame 11 slewably provided on the lower traveling body 2; and an engine 12, a fan 13, a heat exchanger 14, a hydraulic pump 15, an exhaust aftertreatment device 16, a mount table 17, a cover 18, a fuel tank 19, a reducing agent tank 20, a hydraulic oil tank 21 and a control valve (hydraulic device) 22 each provided on the upper frame 11.

The upper frame 11 comprises: a bottom plate 11a attached to the lower traveling body 2 rotatably about the slewing axis J1; a pair of standing plates 11b standingly provided on the bottom plate 11a, and a pair of reinforcing plates 11c fixed, respectively, to upper edges of rear portions of the standing plates 11b. The pair of standing plates 11b are provided on an approximately laterally central region of the bottom plate 11a to extend in a front-rear direction, and laterally opposed to each other. The base end of the boom 5 is disposed between the standing plates 11b, and supported with respect to the standing plates 11b by a boom foot pin (its reference sign is omitted) rotatably about the laterally-extending rotation axis J4. Each of the reinforcing plates 11c is placed on a corresponding one of the standing plates 11b in orthogonal relation, and welded to an upper edge face of the corresponding standing plate 11b.

The engine 12 has an output shaft 12a (see FIG. 2), and is supported on the upper frame 11 in a posture where the output shaft 12a is oriented along the right-left direction. Specifically, the engine 12 is placed on the reinforcing plates 11c through non-illustrated mounts to extend between the reinforcing plates 11c. More specifically, the engine 12 is installed in a range ranging from a position slightly leftward of the left standing plate 11b to a position slightly rightward of the right standing plate 11b.

The fan 13 is connected to a left end portion of the output shaft 12a of the engine 12, and configured to be rotated according to driving of the engine 12.

The heat exchanger 14 is provided on a left side of the fan 13, and configured to be cooled by outside air introduced by the fan 13. The heat exchanger 14 is operable to cool cooling water and hydraulic oil.

The hydraulic pump 15 is connected to a right end portion of the output shaft 12a of the engine 12, and configured to discharge hydraulic oil according to driving of the engine 12.

The exhaust aftertreatment device 16 is provided over the hydraulic pump 15 while being supported by the mount table 17. The exhaust aftertreatment device 16 and the mount table 17 will be described in detail later.

The cover 18 is provided at a rear portion of the upper frame 11, and has: a rear wall portion 27 covering a space over the upper frame from therebehind; lateral walls 28 covering the space, respectively, from right and left lateral sides thereof; and a ceiling wall portion 29 covering the space from thereabove. That is, the cover 18 covers the engine 12, the fan 13, the heat exchanger 14, the hydraulic pump 15 and the exhaust aftertreatment device 16, from therebehind, lateral sides thereof and thereabove. The rear wall portion 27 has an approximately arc shape about the slewing axis J1 in top plan view. In FIG. 2, the ceiling wall portion 29 is omitted, and the rear wall portion 27 and the lateral walls 28 are indicated by the two-dot chain lines (the same applies to FIG. 4, FIG. 6 and FIG. 8). In FIG. 3, the cover 18 is omitted (the same applies to FIG. 5 and FIG. 7).

The fuel tank 19 is provided on a right edge region of the bottom plate 11a at a position in front of the hydraulic pump 15 and the exhaust aftertreatment device 16.

The reducing agent tank 20 is designed to contain a liquid reducing agent (e.g., aqueous urea solution) to be supplied to the exhaust aftertreatment device 16, and placed on the fuel tank 19.

The hydraulic oil tank 21 is provided in front of the hydraulic pump 15 and the exhaust aftertreatment device 16 and between the fuel tank 19 and the right standing plate 11b.

The control valve 22 is provided in front of the exhaust aftertreatment device 16, the fuel tank 19 and the hydraulic oil tank 21.

The control valve 22 is connected to the hydraulic actuators attached to the hydraulic excavator 1, via a plurality of hydraulic lines so as to control operations of the hydraulic actuators. As illustrated in FIG. 3, among the plurality of hydraulic lines 22a, a specific group of hydraulic lines 22a connected to the hydraulic actuators attached to the work implement 4 (the arm cylinder 9 and the bucket cylinder 10), and optional hydraulic actuators attached to the work implement 4 as needed (hydraulic actuators used for a breaker, a gripper and the like), is supported by the work implement 4 and the upper frame 11. Specifically, the upper frame 11 is provided with a front support member 11d attached to the standing plate 11b and disposed in such a manner as to extend upwardly from the standing plate 11b. the front support member 11d supports the hydraulic line group 22a at a position in front of the exhaust aftertreatment device 16. The work implement 4 is provided with an upper support member 5a attached to a right lateral surface of the boom 5 and supporting the hydraulic line group 22a at a position above the exhaust aftertreatment device 16.

Figure 4:
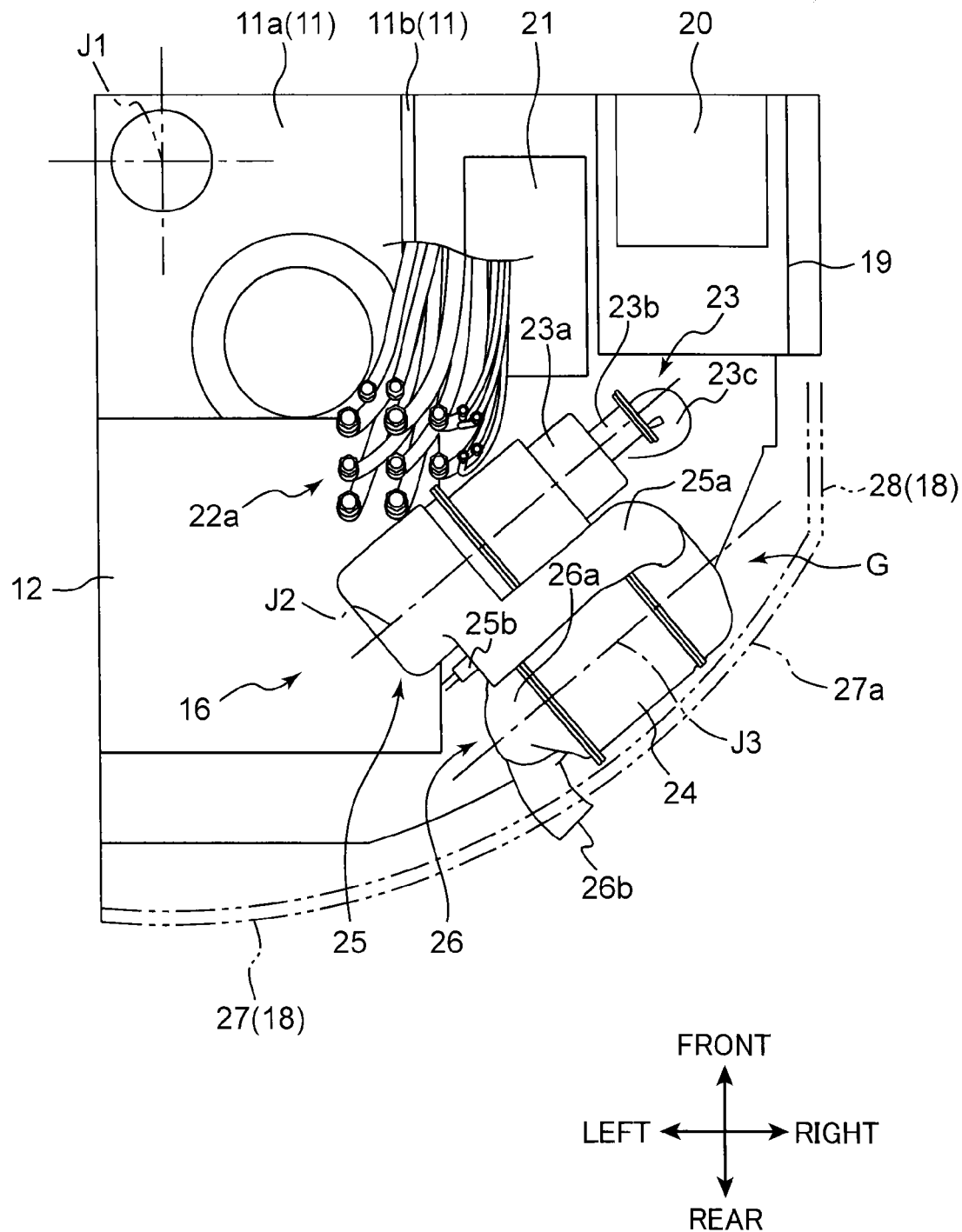
FIG. 4 is a top plan view enlargedly illustrating a part of the upper slewing body in FIG. 2.
Figure 5:
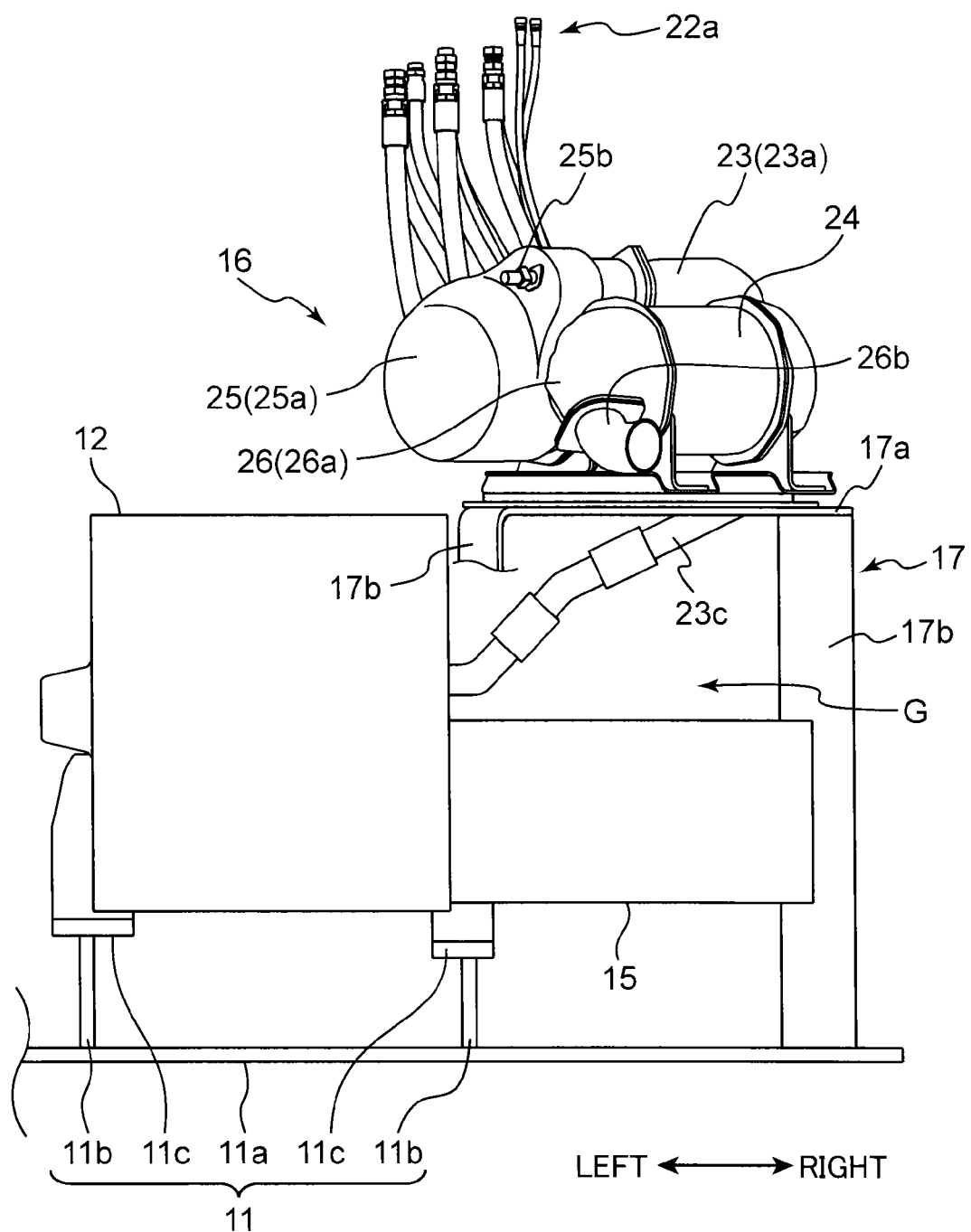
FIG. 5 is a rear view illustrating a substantial part of the upper slewing body in FIG. 2.

With reference to FIGS. 3 to 5, respective structures of the exhaust aftertreatment device 16 and the mount table 17 will be described in detail below.

The exhaust aftertreatment device 16 comprises: a first treatment section 23 capable of removing particulate matter (hereinafter referred to as "PM": first component) contained in exhaust gas of the engine; a second treatment section 24 capable of removing nitrogen oxides (hereinafter referred to as "NOx": second component) contained in the exhaust gas; a connection section 25 connecting the first treatment section 23 and the second treatment section together; and a muffler (silencer) 26.

The first treatment section 23 comprises: a first section body 23a comprised of a DPF (Diesel Particulate Filter) for trapping PM and a housing containing therein the DPF; and a joint portion 23b provided at an edge face of one end (right front end) of the first section body 23a in a longitudinal direction J2 of the first section body 23a, to introduce the exhaust gas into the first section body 23a. Furthermore, the hydraulic excavator 1 comprises an exhaust pipe 23c extending from the engine 12 to the exhaust aftertreatment device 16, wherein one end portion of the exhaust pipe 23c is connected to the engine 12, and the other end portion of the exhaust pipe 23c is connected to the joint portion 23b.

The second treatment section 24 is capable of removing NOx by means of a selective catalytic reduction (hereinafter referred to as "SCR") reaction using the liquid reducing agent. Specifically, the second treatment section 24 comprises a catalyst capable of promoting the SCR reaction of NOx, and a housing containing therein this catalyst.

The connection section 25 comprises: a connection duct 25a connecting a non-illustrated outlet port provided at the other end portion (left rear end portion) of the first section body 23a on a side opposite to the joint portion 23b in the longitudinal direction J2, and a non-illustrated inlet port provided at one end portion (right front end portion) of the second treatment section 24 in a longitudinal direction J3 thereof; and an injector 25b operable to inject the liquid reducing agent into the connection duct 25a. The injector 25b is installed in a surface of one end (left rear end) of the exhaust aftertreatment device 16 on a side opposite to the joint portion 23b.

The muffler 26 comprises: a muffler body 26a connected to a non-illustrated outlet port of the second treatment section 24 provided at the other end portion (left rear end portion) thereof on a side opposite to the inlet port in the longitudinal direction J3; and a tail-pipe 26b extending rearwardly from the muffler body 26a.

As illustrated in FIG. 4, exhaust gas discharged from the engine 12 is introduced into the first section body 23a via the exhaust pipe 23c, and, after flowing through the first section body 23a in a direction from the right front end to the left rear end thereof, introduced into a left rear end portion of the connection section 25. Then, after flowing through the connection section 25 in a direction from the left rear end to a right front end thereof, the exhaust gas is introduced into the second treatment section 24, and, after flowing through the second treatment section 24 in a direction from the right front end to the left rear end thereof, introduced into the muffler body 26a, whereafter the exhaust gas is discharged rearward of the upper slewing body 3 via the tail-pipe 26b.

The first treatment section 23 and the second treatment section 24 are supported over the upper frame 11 in a posture where respective longitudinal directions J2, J3 of the first and second treatment sections 23, 24 are oriented parallel to each other in top plan view, and the first and second treatment sections 23, 24 are arranged on the same horizontal plane. Respective exhaust gas flow directions in the first and second treatment sections 23, 24 are oriented oppositely and parallel to each other. That is, in this embodiment, the longitudinal directions J2, J3 of the first and second treatment sections 23, 24 and the exhaust gas flow directions in the first and second treatment sections 23, 24 are oriented parallel to each other.

The mount table 17 supporting the exhaust aftertreatment device 16 at a position over the upper frame 11 will be described later.

The mount table 17 comprises: a pair of legs 17b standingly provided on the bottom plate 11a at respective positions on front and rear sides of the hydraulic pump 15; and a top plate 17a fixed to upper end portions of the legs 17b, while being superposed over the hydraulic pump 15. The exhaust aftertreatment device 16 is placed on the top plate 17a.

An arrangement over the upper frame 11 of the exhaust aftertreatment device 16 and components therearound will be described below.

The engine 12 is provided on the upper frame 11 at a position in front of the rear wall portion 27, in such a manner that an interspace G is formed between the engine 12 and a right end portion (hereinafter referred to as "curved portion 27a") of the rear wall portion 27 curved in an approximately arc shape in top plan view.

The exhaust aftertreatment device 16 (the top plate 17a of the mount table 17) is provided in front of the rear wall portion 27 while being superposed over the interspace G. In this state, the first and second treatment sections 23, 24 are supported over the upper frame 11 in a posture where the longitudinal directions J2, J3 of the first and second treatment sections 23, 24 are oriented parallel to each other in top plan view, as mentioned above. Further, the first and second treatment sections 23, 24 are supported over the upper frame 11 in a posture where the longitudinal directions J2, J3 of the first and second treatment sections 23, 24 are oriented along the curved portion 27a in top plan view. More specifically, as illustrated in FIG. 4, the curved portion 27a as the right end portion of the rear wall portion 27 is inclined with respect to the front-rear direction in such a manner that a right side portion of the curved portion 27a is located more frontwardly that a left side portion thereof in top plan view, and, correspondingly, the longitudinal directions J2, J3 of the first and second treatment sections 23, 24 are also inclined with respect to the front-rear direction in such a manner that right side portions of the first and second treatment sections 23, 24 are located more frontwardly that left side portions thereof in top plan view. This makes it possible to allow the first and second treatment sections 23, 24 to come close to each other in the front-rear direction, and allow a lateral surface (rear lateral surface) of the second treatment section 24 extending along the longitudinal direction J3 thereof to come close to the rear wall portion 27.

A left rear end portion of the exhaust aftertreatment device 16 (the left rear end portion of the connection section 25: hereinafter referred to as "first end portion") is disposed to be superposed over the engine 12. On the other hand, a right front end portion of the exhaust aftertreatment device 16 on a side opposite to the first end portion (the right front end portions of the first treatment section 23 and the connection section 25: hereinafter referred to as "second end portion") is disposed outside (on a right side of) the engine 12 in top plan view. The joint portion 23b is provided at an edge face of the second end portion of the exhaust aftertreatment device 16 (the edge face of the right front end of the first treatment section 23 in the longitudinal direction J2). This makes it possible to dispose the joint portion 23b at a position away from the engine 12. Thus, a space necessary for changing a direction of the exhaust pipe 23c toward the engine 12 can be sufficiently ensured between the exhaust aftertreatment device 16 and the engine 12.

As illustrated in FIG. 3, the hydraulic line group 22a connected from the control valve 22 on the upper frame 11 to the hydraulic actuators attached to the work implement 4 (in the embodiment illustrated in FIG. 1, the arm cylinder 9 and the bucket cylinder 10) are routed via a position in front of the exhaust aftertreatment device 16, in a state in which the boom 5 is raised to a maximally raised position illustrated in FIG. 1. Specifically, the hydraulic line group 22a is disposed in such a manner as to, in the state in which the boom 5 is raised to the maximally raised position, extend rearwardly from the control valve 22, and then extend upwardly toward the arm cylinder 9 and the bucket cylinder 10 via the position in front of the exhaust aftertreatment device 16. More specifically, an upper region of a front-side portion (its reference sign is omitted) of the hydraulic line group 22a located at the position in front of the exhaust aftertreatment device 16 is supported by the upper support member 5a attached to the work implement 4. On the other hand, a frontward region of the front-side portion of the hydraulic line group 22a is supported by the front support member 11d attached to the upper frame 11. Thus, even in a situation where the boom 5 is raised to the maximally raised position and thereby the hydraulic line group 22a is moved rearwardly, it becomes possible to suppress interference between the exhaust aftertreatment device 16 and the hydraulic line group 22a.

As described above, the longitudinal directions J2, J3 of the first and second treatment sections 23, 24 are oriented parallel to each other and along the curved portion 27a, so that it becomes possible to arrange the curved portion 27a and the rear lateral surface of the second treatment section 24 extending along the longitudinal direction J3 thereof in closely adjacent relation to each other, while arranging the first and second treatment sections 23, 24 in closely adjacent relation to each other. Thus, as compared to the technique described in the Patent Literature 1 in which the two treatment sections are arranged side-by-side in the right and left direction, and the longitudinal edge faces of the treatment sections are oriented rearwardly, it becomes possible to reduce a dead space which would otherwise be formed between the curved portion 27a and the treatment sections 23, 24. Further, in the above embodiment, the treatment sections 23, 24 can be arranged rearwardly in a more closely packed manner, as compared to the technique described in the Patent Literature 1 in which the longitudinal directions of the two treatment sections are oriented along the front-rear direction, so that it becomes possible to widely ensure a space in front of the exhaust aftertreatment device 16.

Furthermore, the exhaust aftertreatment device 16 is disposed offset laterally with respect to the engine 12 (the exhaust aftertreatment device 16 is disposed to be superposed over the interspace G between the engine 12 and the curved portion 27a), so that an open space can be formed above the engine 12 to thereby ensure a space for maintenance of the engine 12.

Therefore, it becomes possible to efficiently dispose the exhaust aftertreatment device 16 over the upper frame 11, while ensuring a space for maintenance of the engine 12.

The hydraulic excavator according to the first embodiment can further bring out the following advantageous effects.

The joint portion 23b is provided at the second end portion (right front end portion) of the exhaust aftertreatment device 16 which is located on a side opposite to the first end portion (left rear end portion) disposed adjacent to the engine 12, and outside the engine 12 in top plan view. Thus, a space (e.g., the interspace G) between the engine 12 and the second end portion of the exhaust aftertreatment device 16 can be effectively utilized to allow a direction of the exhaust pipe 23c to be changed toward the engine 12.

The hydraulic line group 22a is routed by utilizing a space formed in front of the exhaust aftertreatment device 16 by arranging the first and second treatment sections 23, 24 along the curved portion 27a in the above manner, so that it becomes possible to suppress interference between the exhaust aftertreatment device 16 and the hydraulic line group 22a.

Specifically, by using the upper support member 5a attached to the work implement 4 (boom 5) and the front support member 11d attached to the upper frame 11, the hydraulic line group 22a can be reliably routed via the position in front of the exhaust aftertreatment device 16.

The first and second treatment sections 23, 24 are provided on the same horizontal plane, so that it becomes possible to prevent the hydraulic excavator 1 from being increased in height dimension, while suppressing formation of the aforementioned dead space over the upper frame 11.

<Second Embodiment (FIG. 6)>

In the first embodiment, the second treatment section 24 is disposed at a position closer to the rear wall portion 27, as compared to the first treatment section 23. However, the arrangement of the first and second treatment sections 23, 24 is not limited thereto, but the first and second treatment sections 23, 24 may be supported over the upper frame 11 in a posture where respective longitudinal directions J2, J3 thereof are oriented parallel to each other in top plan view and along the curved portion 27a in top plan view.

Figure 6:
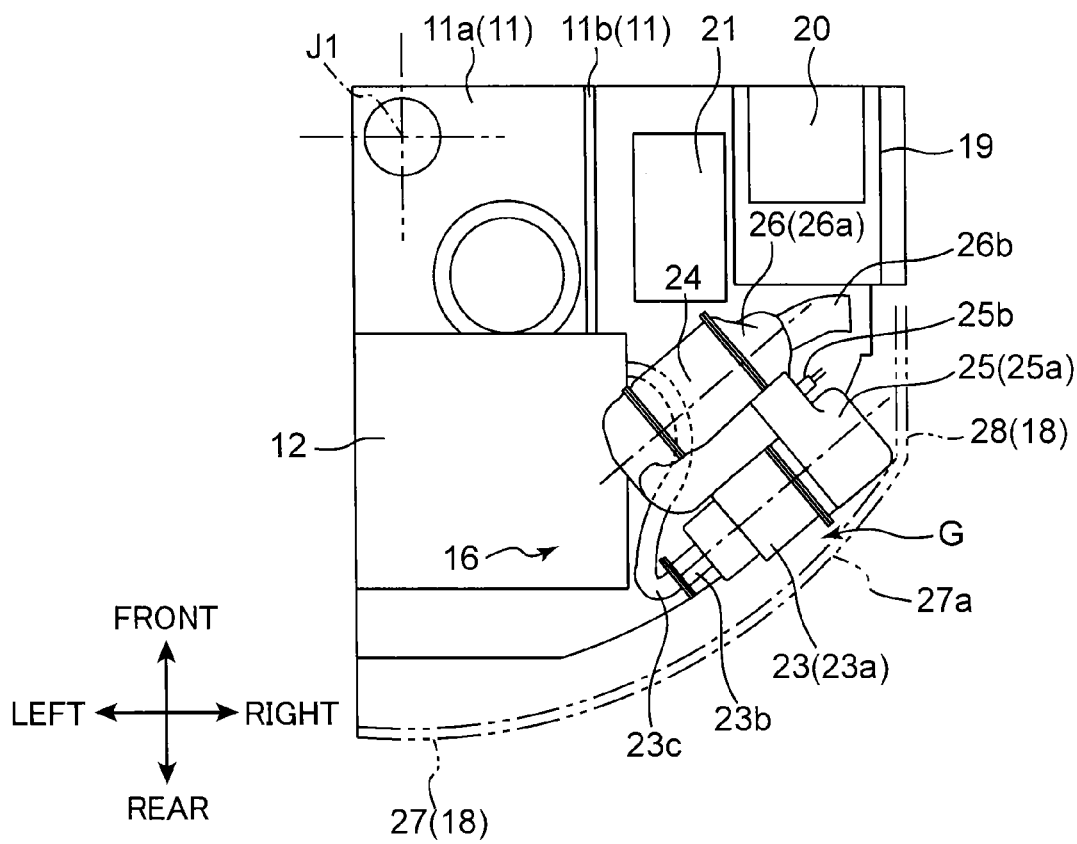
FIG. 6 is a view corresponding to FIG. 4, in a hydraulic excavator according to a second embodiment of the present invention.

For example, the first treatment section 23 and the second treatment section 24 can be reversely arranged, as in a second embodiment of the present invention illustrated in FIG. 6.

FIG. 6 illustrates a tail pipe 26b having the same length as that of the tail pipe 26b in the first embodiment. However, considering that, in the second embodiment, a distance between the tail pipe 26b and the cover 18 can be increased, the tail pipe 26b in the second embodiment may be elongated to enhance a noise reduction effect.

<Third Embodiment (FIG. 7)>

In the first and second embodiments, the joint portion 23b is provided at an edge face of one lateral end of the exhaust aftertreatment device 16 (edge face of the first treatment section 23 in the longitudinal direction J2). However, the arrangement of the joint portion 23b is not limited thereto. Preferably, the joint portion 23b is provided at the second end portion of the exhaust aftertreatment device 16 which is located on a side opposite to the first end portion disposed to be superposed over the engine 12, and outside the engine 12 in top plan view.

Figure 7:
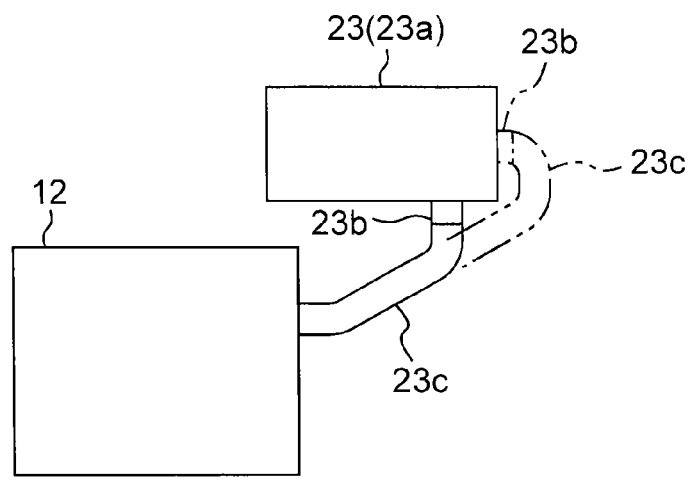
FIG. 7 is a schematic diagram illustrating a substantial part of a hydraulic excavator according to a third embodiment of the present invention.

For example, the joint portion 23b may be provided at a lower surface of the second end portion of the exhaust aftertreatment device 16, as in a third embodiment of the present invention illustrated in FIG. 7, (in FIG. 7, the joint portion 23b is provided at a lower surface of the first section body 23a).

In the third embodiment, the exhaust pipe 23c can be shortened, as compared to that in the aforementioned embodiments indicated by the two-dot chain line, so that it becomes possible to reduce a space necessary for the exhaust pipe 23c.

<Fourth Embodiment (FIG. 8)>

In the first to third embodiments, the engine 12 is disposed on a left side of the curved portion 27a. However, the arrangement of the engine 12 is not limited thereto, but may be provided on the upper frame 11 at a position in front of the rear wall portion 27 in such a manner that an interspace G is formed between the engine 12 and the curved portion 27a.

Figure 8:
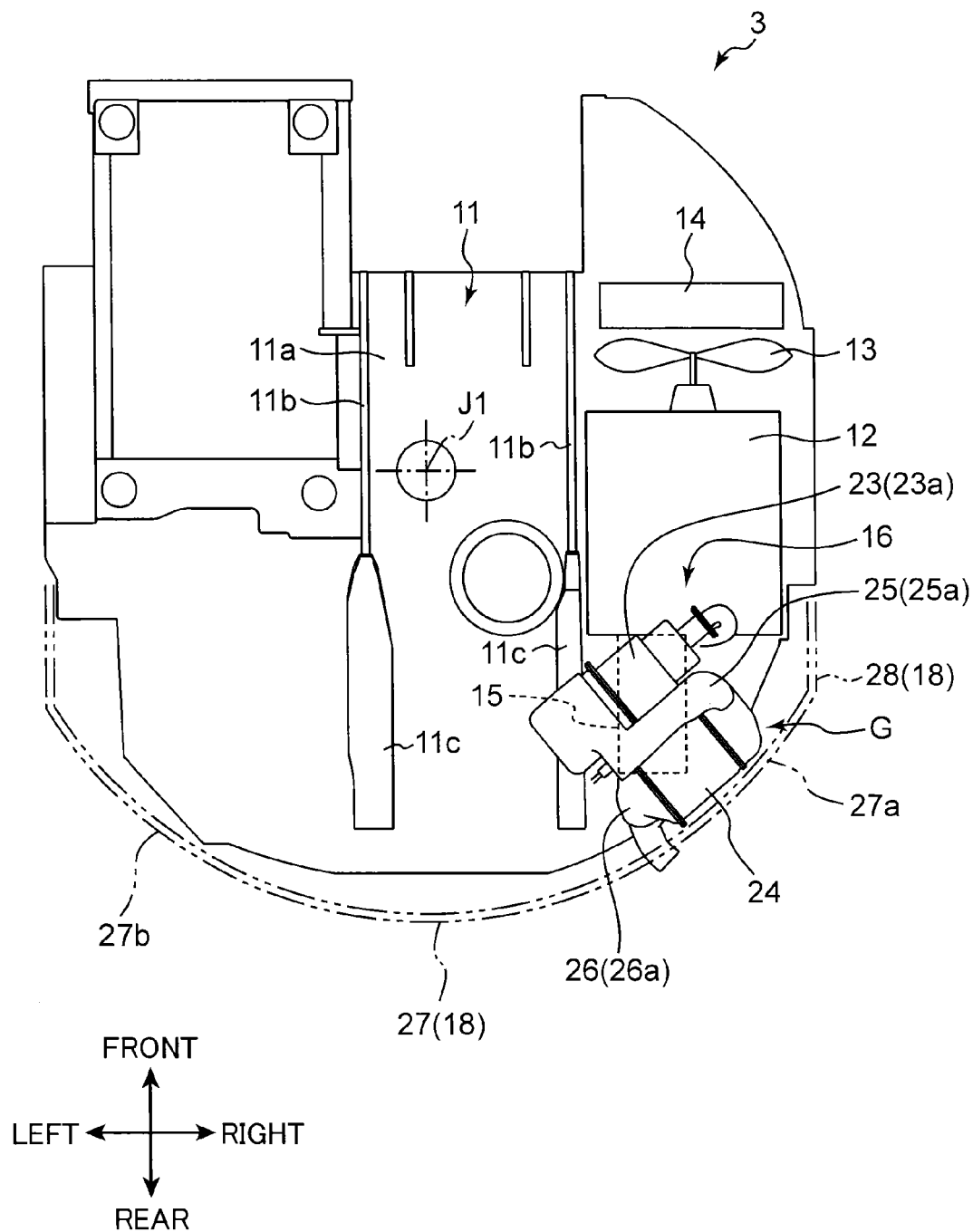
FIG. 8 is a view corresponding to FIG. 2, in a hydraulic excavator according to a fourth embodiment of the present invention.

For example, the engine 12 may be provided in front of the curved portion 27a in such a manner that an interspace G is formed between the engine 12 and the curved portion 27a, as in a fourth embodiment of the present invention illustrated in FIG. 8.

Further, as illustrated in FIG. 8, a left end portion of the rear wall portion 27 may be formed as the curved portion 27b, and the engine 12 and the exhaust aftertreatment device 16 may be arranged on the side of the left end portion.

It should be understood that the present invention is not limited to the above embodiments. For example, the following modifications may be employed.

In the above embodiments, an interspace G is formed between the curved portion 27a and a portion of the engine 12 on the side of the hydraulic pump 15. However, a direction of the engine 12 with respect to the curved portion 27a is not particularly limited. For example, the engine 12 may be oriented in such a manner that an interspace G is formed between the curved portion 27a and a portion of the engine 12 on the side of the fan 13. In this case, the fan 13 and the heat exchanger 14 can be arranged within the interspace G.

In the above embodiments, the first and second treatment sections 23, 24 are provided on the same horizontal plane (arranged side-by-side in a horizontal direction). Alternatively, one of the first and second treatment sections 23, 24 may be superposed over the other.

In the above embodiments, a treatment section comprising a DPF has been shown as an example of the first treatment section 23, and a treatment section comprising an SCR catalyst has been shown as an example of the second treatment section 24. However, the first treatment section may be any type capable of removing a first component contained in the exhaust gas, and the second treatment section may be any type capable of removing a second component contained in the exhaust gas.

The construction machine of the present invention is not limited to the hydraulic excavator, but may be a crane or a demolishing machine. Further, it is not limited to a hydraulic type, but may be a hybrid type.

The above specific embodiments mainly include an invention having the following features.

In order to solve the aforementioned problem, the present invention provides a construction machine which comprises: a lower traveling body; an upper frame slewably provided on the lower traveling body; a rear wall portion provided at a rear portion of the upper frame to cover a space over the upper frame from therebehind, wherein the rear wall portion has a curved portion curved in an approximately arc shape in top plan view to serve as a right or left end thereof; an engine provided on the upper frame at a position in front of the rear wall portion in such a manner that an interspace is formed between the engine and the curved portion; and an exhaust aftertreatment device configured to treat exhaust gas of the engine, and provided in front of the rear wall portion while being superposed over the interspace, the exhaust aftertreatment device comprising a first treatment section capable of removing a first component contained in the exhaust gas, and a second treatment section capable of removing a second component contained in the exhaust gas, wherein the first treatment section and the second treatment section are supported over the upper frame in a posture where respective longitudinal directions thereof are oriented parallel to each other in top plan view and along the curved portion in top plan view.

In the construction machine of the present invention, the longitudinal directions of the first and second treatment sections are oriented parallel to each other and along the curved portion, so that it becomes possible to arrange the curved portion and a lateral surface of one of the treatment sections extending along the longitudinal direction thereof, in closely adjacent relation to each other, while arranging the first and second treatment sections in closely adjacent relation to each other. Thus, as compared to the technique described in the Patent Literature 1 in which the two treatment sections are arranged side-by-side in the right and left (lateral) direction, and the longitudinal edge faces of the treatment sections are oriented rearwardly, it becomes possible to reduce a dead space which would otherwise be formed between the curved portion and the treatment sections. Further, in the present invention, the treatment sections can be arranged rearwardly in a more closely packed manner, as compared to the technique described in the Patent Literature 1 in which the longitudinal directions of the two treatment sections are oriented along the front-rear direction, so that it becomes possible to widely ensure a space in front of the exhaust aftertreatment device.

In addition, the exhaust aftertreatment device is disposed offset laterally with respect to the engine (the exhaust aftertreatment device is disposed to be superposed over the interspace between the engine and the curved portion), so that it becomes possible to form an open space above the engine to ensure a space for maintenance of the engine.

Therefore, the construction machine of the present invention makes it possible to efficiently dispose the exhaust aftertreatment device over the upper frame, while ensuring a space for maintenance of the engine.

As used in this specification, the term "longitudinal directions—are oriented—along the curved portion in top plan view" means that the longitudinal directions of the first and second treatment sections are inclined with respect to the front-rear direction in conformity to an inclination of the curved portion, in top plan view.

In order to lead exhaust gas from the engine to the exhaust aftertreatment device, the engine and the exhaust aftertreatment device may be coupled through an exhaust pipe. In this case, if a portion of the exhaust aftertreatment device to which the exhaust pipe is to be connected is located at a position excessively close to the engine, it becomes difficult to sufficiently ensure a space necessary for changing a direction of the exhaust pipe toward the engine.

Therefore, when the above construction machine further comprises an exhaust pipe extending from the engine to the exhaust aftertreatment device, the exhaust aftertreatment device preferably has: a first end portion disposed to be superposed over the engine; a second end portion as an end on a side opposite to the first end portion, disposed outside the engine in top plan view; and a joint portion which is provided at the second end portion and to which the exhaust pipe is connected.

In this embodiment, the joint portion is provided at the second end portion of the exhaust aftertreatment device which is located on a side opposite to the first end portion disposed adjacent to the engine, and outside the engine in top plan view. Thus, a space (e.g., the interspace) between the engine and the second end portion of the exhaust aftertreatment device can be effectively utilized to allow a direction of the exhaust pipe to be changed toward the engine.

Further, when the above construction machine further comprises: a work implement attached to the upper frame raisably and lowerably about a rotation axis extending along a right-left direction; a hydraulic actuator attached to the work implement; a hydraulic device provided on the upper frame and in front of the exhaust aftertreatment device; and a hydraulic line extending from the hydraulic device to the hydraulic actuator, a halfway portion of the hydraulic line is moved backward according to a raising operation of the work implement, thereby causing a problem of interference between the halfway portion of the hydraulic line and a device over the upper frame.

Therefore, in such a construction machine, the hydraulic line is preferably disposed in such a manner as to, in a state in which the work implement is raised to a preset maximally raised position, extend rearwardly from the hydraulic device, and then extend upwardly toward the hydraulic actuator via a position in front of the exhaust aftertreatment device.

In this aspect, the hydraulic line is routed by utilizing a space formed in front of the exhaust aftertreatment device by arranging the first and second treatment sections along the curved portion in the above manner, so that it becomes possible to suppress interference between the hydraulic line and the exhaust aftertreatment device.

Specifically, the above construction machine may further comprise: an upper support member attached to the work implement and supporting an upper region of a front-side portion of the hydraulic line located at the position in front of the exhaust aftertreatment device in the state in which the work implement is raised to the maximally raised position; and a front support member attached to the upper frame and supporting a frontward region of the front-side portion of the hydraulic line. In this case, the hydraulic line can be reliably routed via the position in front of the exhaust aftertreatment device.

In the above construction machine, one of the first treatment section and the second treatment section may be superposed over the other from above. In this case, however, a height dimension of the exhaust aftertreatment device is inevitably increased.

Therefore, preferably, in the above construction machine, the first treatment section and the second treatment section are provided on a same horizontal plane.

This makes it possible to prevent the construction machine from being increased in height dimension, while suppressing formation of the aforementioned dead space over the upper frame.

This application is based on Japanese Patent application No. 2014-232994 filed in Japan Patent Office on Nov. 17, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
a lower traveling body;
an upper frame slewably provided on the lower traveling body;
a rear wall portion provided at a rear portion of the upper frame to cover a space over the upper frame from therebehind, the rear wall portion having a curved portion curved in an approximately arc shape in top plan view to serve as a right or left end thereof;
an engine provided on the upper frame at a position in front of the rear wall portion in such a manner that an interspace is formed between the engine and the curved portion;
an exhaust aftertreatment device configured to treat exhaust gas of the engine, and provided in front of the rear wall portion while being superposed over the interspace, the exhaust aftertreatment device comprising a first treatment section capable of removing a first component contained in the exhaust gas, and a second treatment section capable of removing a second component contained in the exhaust gas,
a work implement attached to the upper frame raisably and lowerably about a rotation axis extending along a right-left direction;
a hydraulic actuator attached to the work implement;
a hydraulic device provided on the upper frame and in front of the exhaust aftertreatment device; and
a hydraulic line extending from the hydraulic device to the hydraulic actuator,
wherein the first treatment section and the second treatment section are supported over the upper frame in a posture where respective longitudinal directions thereof are oriented parallel to each other in top plan view and along the curved portion in top plan view, and
the hydraulic line is disposed in such a manner as to, in a state in which the work implement is raised to a preset maximally raised position, extend rearwardly from the hydraulic device, and then extend upwardly toward the hydraulic actuator via a position in front of the exhaust aftertreatment device.

2. The construction machine according to claim 1, further comprising an exhaust pipe extending from the engine to the exhaust aftertreatment device,
wherein the exhaust aftertreatment device includes: a first end portion disposed to be superposed over the engine; a second end portion as an end on a side opposite to the first end portion, disposed outside the engine in top plan view; and a joint portion which is provided at the second end portion and to which the exhaust pipe is connected.

3. The construction machine according to claim 1, further comprising:
an upper support member attached to the work implement and supporting an upper region of a front-side portion of the hydraulic line located at the position in front of the exhaust aftertreatment device in the state in which the work implement is raised to the maximally raised position, and
a front support member attached to the upper frame and supporting a frontward region of the front-side portion of the hydraulic line.

4. The construction machine according to claim 1, wherein the first treatment section and the second treatment section are provided on a same horizontal plane.

5. The construction machine according to claim 1, wherein the upper frame comprises a bottom plate, and a pair of standing plates standingly provided on the bottom plate, the pair of standing plates extending in a front-rear direction and being laterally opposed to each other,
the work implement is disposed between the standing plates and supported with respect to the standing plates by the rotation axis,
the hydraulic device is provided in a first region on the bottom plate located on a lateral side of one standing plate opposite to other lateral side thereof where the other standing plate is arranged, and the exhaust aftertreatment device is disposed to be superposed over the first region on the bottom plate.

* * * * *